W. J. FERNIE & G. MICHOT.
SCUTCHING FLAX OR OTHER FIBROUS MATERIALS.
APPLICATION FILED JUNE 20, 1913.
1,095,495.
Patented May 5, 1914.
2 SHEETS—SHEET 1.
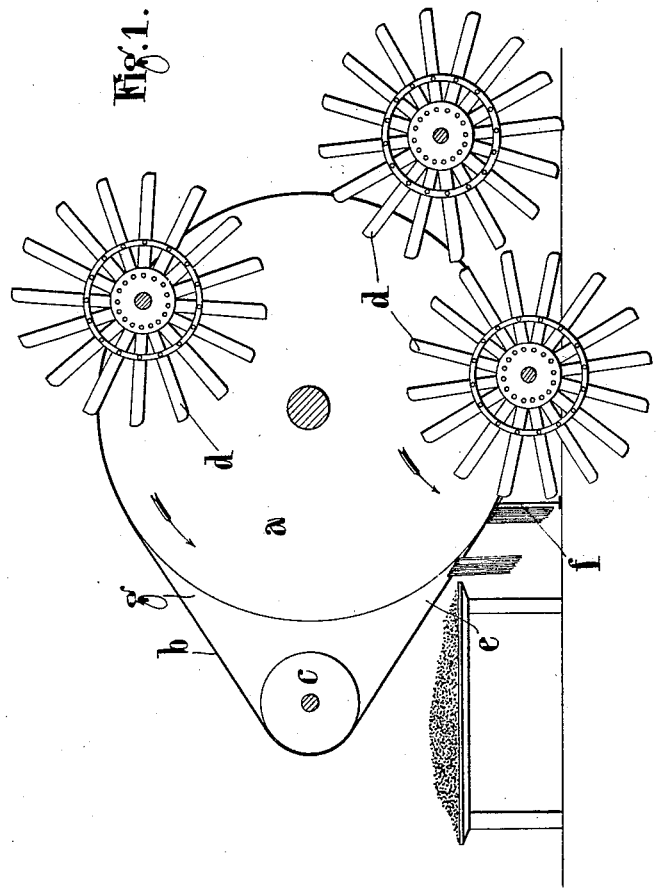
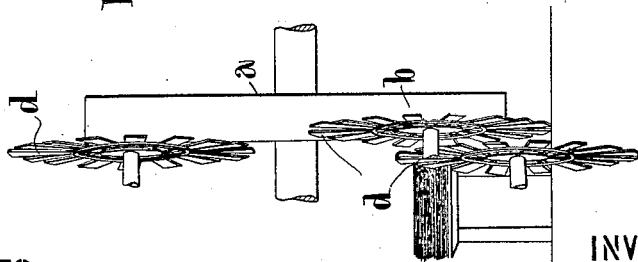

W. J. FERNIE & G. MICHOT.
SCUTCHING FLAX OR OTHER FIBROUS MATERIALS.
APPLICATION FILED JUNE 20, 1913.
1,095,495.
Patented May 5, 1914.
2 SHEETS—SHEET 2.
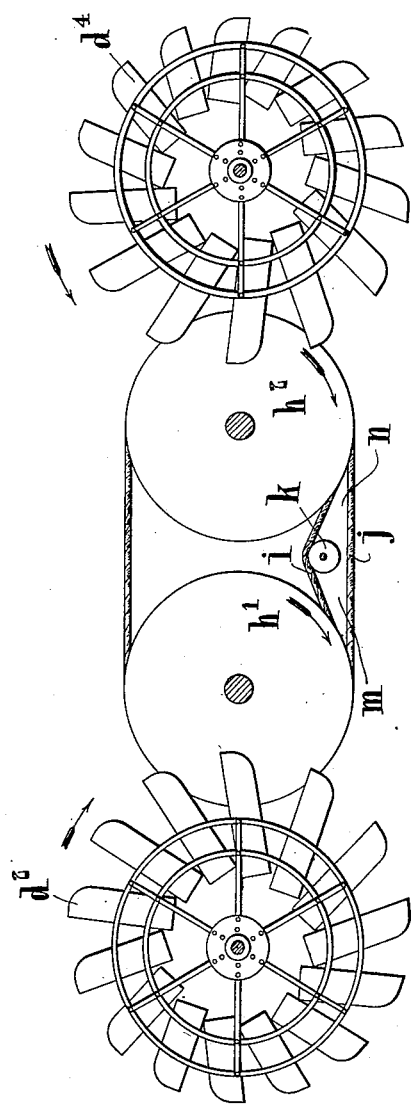
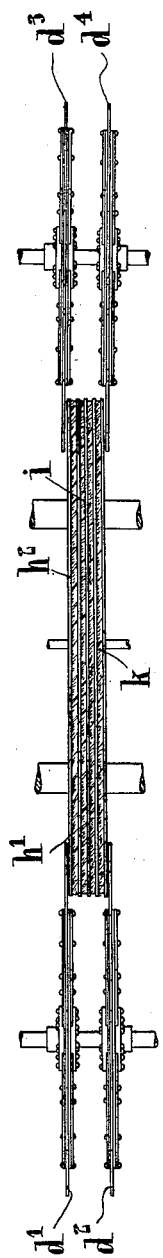

UNITED STATES PATENT OFFICE.

WILLIAM JAMES FERNIE AND GEORGES MICHOT, OF NEWARK-UPON-TRENT, ENGLAND.

SCUTCHING FLAX OR OTHER FIBROUS MATERIALS.

1,095,495. Specification of Letters Patent. Patented May 5, 1914.

Application filed June 20, 1913. Serial No. 774,855.

*To all whom it may concern:*

Be it known that we, WILLIAM JAMES FERNIE, a subject of the King of Great Britain and Ireland, and residing at the White House, Newark-upon-Trent, in the county of Nottingham, England, and GEORGES MICHOT, a citizen of the Swiss Republic, and residing at the Ossington, Newark-upon-Trent, in the county of Nottingham, England, have invented certain new and useful Improvements in and Relating to the Scutching of Flax or other Fibrous Materials, of which the following is a specification.

This invention relates to the scutching of flax or other fibrous materials.

This invention has for its object to provide an improved scutching arrangement in which the material is treated in a more uniform and economical manner than formerly.

In scutching arrangements as heretofore proposed, the blades of the scutching devices are short radially and very wide axially, and cannot enter the mass of the material presented to them, but operate by beating, stroking or scraping the outside layers of the fibers with which they are in contact, and such proposals for the treatment of flax, so far as we are aware, have not been successful in practice owing to the severe treatment of the fibers, which this mode of operation entails.

According to the present invention however the material is mechanically forwarded and subjected to the scutching action of one or more scutching wheels provided with radially free blades, which are adapted to successively enter the mass of the material during the rotation of the wheels.

Referring now to the accompanying drawings:—Figure 1 shows an elevation of a scutching machine constructed according to our improvements, while Fig. 2 shows an end view of the same. Fig. 3 shows an elevation of a modification of the machine shown in Fig. 1, while Fig. 4 is a plan view of the machine shown in Fig. 3.

The drawings are of a somewhat diagrammatic nature throughout, and are not to be taken as working drawings.

In carrying this invention into effect according to one form, a drum, $a$, of fairly large diameter is provided around which a broad band, $b$, is disposed, the band being in contact with the drum for the greater part of its circumference, but passing at one portion around a relatively small drum, $c$, so as to leave a space between the band and the main drum at a portion of the circumference of the latter. At one side of the main drum, $a$, and situated about the path of the band, $b$, are a series of scutching wheels, $d$, which in the present case are three in number, and are adapted to rotate in a direction opposite to that in which the main drum rotates. The scutching wheels are preferably arranged so that the planes of the wheels are slightly inclined to the plane of the drum, $a$. In employing such a device for the operation of scutching, the material, for instance flax, is introduced at the point, $e$, between the band and the main drum. The large drum being rotated in the direction of the arrows, the material is drawn between the band and the drum, and firmly held so that it is gradually advanced toward the first scutching wheel, whereby it is treated in the usual way, there being preferably provided a standard, $f$, below the belt so as to support the latter, while the flax is being scutched. The material continues under the action of the first scutching wheel until it is carried out of its zone of action by the rotation of the main drum. As the scutching wheels are set at an angle to the main drum, it will be evident that the material will be clear of the zone of action of the first scutching wheel before being carried into the zone of the action of the next scutching wheel, which may be situated as shown in Fig. 1. As the material has however maintained the same aspect with relation to the axis of the drum, it now approaches the second scutching wheel from a different aspect, and another portion of the material is exposed to the action of the wheel. The treatment to which it has been subjected by the first wheel is now repeated, and the material passing on is in the same way exposed on a fresh surface to the action of the third wheel, after which it is gradually passed to the point, $g$, at which the band leaves the drum. The position of the material may then be changed with reference to the drum so that the part already scutched is gripped by the band, and the part previously gripped is exposed to the action of the scutching wheels. The drum, $c$, may preferably be provided with a suitable tensioning device whereby the belt may be maintained at a uniform tension. In some cases we may arrange scutching wheels on both sides of the main drum, so that the material previously gripped between the band and the drum may be brought into operative relationship with the corresponding scutching wheels without reversing the position of the material upon the band. Again, instead of using a belt for gripping and forwarding the material to the various scutching wheels, we may in some cases use a rope or a number of ropes such as we have illustrated in Figs. 3 and 4.

In Figs. 3 and 4 a somewhat modified arrangement of scutching machine is shown. In this case drums or pulleys, $h$ and $h'$, are disposed so as to carry two or more sets of ropes, $i$ and $j$, upon their circumference. In the space between the drums, a jockey pulley, $k$, is provided around which the set of ropes, $i$, is led. This arrangement separates the sets of ropes in order to allow of the insertion and withdrawal of the flax or other material being scutched. Scutching wheels, $d^1$, $d^2$, and $d^3$, $d^4$, are disposed at the sides of the drums, $h$ and $h'$, respectively, and are provided with blades of varied length as shown, the outer tips of the blades lying upon a circle eccentrically disposed with regard to the axis of the wheels. In this arrangement, the blades of the scutching wheels vary in flexibility on account of their variation in length. In the arrangement which we prefer to employ, however, the blades are of uniform length while the wheel which carries them is eccentrically mounted on its driving shaft, so that in this case the blades are of uniform flexibility. By arranging the blades or the wheel eccentrically as above described, each blade acts upon a different portion of the material being scutched.

One method of operating the machine as above described is as follows:—The drums are assumed to rotate in the direction indicated by the arrows, and the flax or other material to be scutched is inserted at the position marked, $m$, so that the heads of the flax are acted upon by the wheels, $d^2$ and $d^4$, while the root ends are acted upon by the wheels, $d^1$ and $d^3$. The length of material overhanging the ropes and operated upon by the wheels, $d^1$ and $d^3$, is adjusted so that in a subsequent scutching operation when that part is gripped between the ropes, the part previously gripped by the ropes is subjected to the action of the scutching wheels, thus enabling the whole length of the material to be conveniently operated upon. On the machine being started, the material is carried around in the direction indicated by the arrows, and is operated on by the wheels, $d^1$ and $d^2$, so that the heads of the material are scutched by the wheel, $d^2$, and the root ends by the wheel, $d'$. After being operated upon by these wheels, the material is carried by being gripped between the ropes, $i$ and $j$, to the wheels, $d^3$ and $d^4$, and similarly operated upon by them. On arriving at the place where the ropes separate, designated by the reference letter, $n$, in Fig. 4, the position of the material on the ropes is shifted by the operator, so that the part which is operated upon by the wheels, $d^1$ and $d^3$, is now gripped between the ropes, and the remainder of the material hangs over the front of the ropes, and on being carried around the pulleys, $h$ and $h'$, is acted upon in succession by the wheels, $d^2$ and $d^4$. The material may be allowed to perform the above cycle of operations as often as necessary, but for ordinary purposes we find that the material is efficiently scutched after the above cycle of operations has been performed once. In some cases we may duplicate the above set of ropes and pulleys and provide scutching wheels at one side only of the drums. In this case one part of the material is scutched on the first set of scutching wheels, while the other part of the material is scutched on the other set of wheels, a conveyer being conveniently disposed for transferring the material from one set of scutching wheels to the other. If desired, in the above arrangement, an extra scutching wheel may be provided at any convenient point for giving an additional amount of scutching to the heads of the material.

We find that a suitable speed of the machine which allows efficient scutching to be effected, requires that the scutching wheels make 120 revolutions to one revolution of the drums which carry the material, and that for this arrangement it is desirable to arrange that the material is being subjected to the scutching wheels during its travel through about one-third of the circumference of the pulleys, $h$ or $h'$. It will be understood that any desired number of scutching wheels or other devices may be employed, and that the number chiefly depends upon the size of the carrier or drum, and the amount of scutching desired. Also, instead of the ropes as described above, with reference to Figs. 3 and 4, in some cases we may use belts arranged in a similar manner.

It will be understood that the examples above described are referred to by way of illustration only, and that the method of carrying the invention into effect may be very considerably varied as well as the details of the apparatus, without departing from the spirit of the present invention.

Having now described our invention what we claim as new and desire to secure by Letters Patent is:—

1. In a scutching machine, the combination of a rotatably mounted blade-carrying member, together with a plurality of blades disposed on said member and having their tips situated on a circle eccentrically disposed in relation to the axis of rotation of said blade-carrying member, substantially as described.

2. In a scutching machine, the combination of a rotatably mounted blade-carrying member, a plurality of blades disposed on said member and having their tips situated on a circle eccentrically disposed in relation to the axis of rotation of said blade-carrying member, together with means for forwarding material to said blade-carrying member, substantially as described.

3. In a scutching machine, the combination of a rotatably mounted blade-carrying member, a plurality of blades disposed on said member, and having their tips situated on a circle eccentrically disposed in relation to the axis of rotation of said blade-carrying member, together with means for progressively forwarding material to said blade-carrying member, substantially as described.

4. In a scutching machine, the combination of a plurality of blade-carrying members, a plurality of blades disposed on said members and having their tips situated on a circle eccentrically disposed in relation to the axis of rotation of said blade-carrying members, a plurality of pulleys, a plurality of members acting to transmit motion between said pulleys and at the same time to forward material to said scutching devices, together with means for separating said members for the purpose of allowing the material to be inserted therebetween, substantially as described.

5. In a scutching machine, the combination of a plurality of rotatable blade-carrying members, a plurality of blades disposed on said members and having their tips situated on a circle eccentrically disposed in relation to the axis of rotation of said blade-carrying members, a plurality of pulleys, a plurality of ropes acting to transmit motion between said pulleys and at the same time to forward material to said scutching devices, together with a jockey pulley for separating certain of said ropes for the purpose of allowing the material to be inserted therebetween, substantially as described.

6. In a scutching arrangement, a scutching device having a plurality of variable length radially free blades, substantially as described.

7. In a scutching machine, the combination of a rotatably mounted blade-carrying member, a plurality of blades disposed on said member and having their tips situated on a circle eccentrically disposed in relation to the axis of rotation of said blade-carrying member, means for progressively forwarding material to be scutched, said forwarding means being adapted to present different aspects of the material to successive scutching devices, substantially as described.

In testimony whereof we have signed our names to this specification in the presence of two subscribing witnesses.

WILLIAM JAMES FERNIE.
GEORGES MICHOT.

Witnesses to the signature of William James Fernie:
M. ATKINSON ADAM,
BERTRAM H. MATTHEWS.

Witnesses to the signature of Georges Michot:
THOMAS JAMES ELLIOT,
JOHN JACK.

---

Copies of this patent may be obtained for five cents each, by addressing the "Commissioner of Patents, Washington, D. C."